(12) United States Patent
Gschwendtner

(10) Patent No.: US 8,117,034 B2
(45) Date of Patent: Feb. 14, 2012

(54) SYNCHRONISE AN AUDIO CURSOR AND A TEXT CURSOR DURING EDITING

(75) Inventor: Wolfgang Gschwendtner, Vienna (AT)

(73) Assignee: Nuance Communications Austria GmbH, Vienna (AT)

(*) Notice: Subject to any disclaimer, the term of this patent is extended or adjusted under 35 U.S.C. 154(b) by 1323 days.

(21) Appl. No.: 10/106,981

(22) Filed: Mar. 26, 2002

(65) Prior Publication Data
US 2002/0143544 A1 Oct. 3, 2002

(30) Foreign Application Priority Data
Mar. 29, 2001 (EP) .................................. 01890104

(51) Int. Cl.
*G10L 15/26* (2006.01)
*G10L 21/06* (2006.01)
*G10L 15/00* (2006.01)

(52) U.S. Cl. ........ 704/260; 704/235; 704/278; 704/251; 704/276

(58) Field of Classification Search .................. 704/231, 704/531, 235
See application file for complete search history.

(56) References Cited

U.S. PATENT DOCUMENTS

| | | | |
|---|---|---|---|
| 3,648,249 A | 3/1972 | Goldsberry | |
| 3,676,856 A * | 7/1972 | Manly | 715/531 |
| 4,637,797 A | 1/1987 | Whitney et al. | |
| 4,701,130 A | 10/1987 | Whitney et al. | |
| 5,146,439 A | 9/1992 | Jachmann et al. | |
| 5,519,808 A | 5/1996 | Benton, Jr. | |
| 5,602,982 A | 2/1997 | Judd et al. | |
| 5,664,896 A | 9/1997 | Blumberg | |
| 5,748,888 A | 5/1998 | Angelo et al. | |
| 5,799,273 A * | 8/1998 | Mitchell et al. | 704/235 |

(Continued)

FOREIGN PATENT DOCUMENTS

EP 0 840 287 A2 5/1998

(Continued)

OTHER PUBLICATIONS

Batty et al., "The Development of a Portable Read-Time Display of Voice Source Characteristics," IEEE, Euromicro Conference, 2000, pp. 419-422.

(Continued)

*Primary Examiner* — Talivaldis Ivars Smits
*Assistant Examiner* — Farzad Kazeminezhad
(74) *Attorney, Agent, or Firm* — Wolf, Greenfield & Sacks, P.C.

(57) ABSTRACT

A speech recognition device (1) processes speech data (SD) of a dictation and thus establishes recognized text information (ETI) and link information (LI) of the dictation. In a synchronous playback mode of the speech recognition device (1), during the acoustic playback of the dictation a correction device (10) synchronously marks the word of the recognized text information (ETI) which word relates to the speech data (SD) just played back marked by the link information (LI) is marked synchronously, the just marked word featuring the position of an audio cursor (AC). When a user of the speech recognition device (1) recognizes an incorrect word, he positions a text cursor (TC) at the incorrect word and corrects it. Cursor synchronization means (15) now make it possible to synchronize the text cursor (TC) with the audio cursor (AC) or the audio cursor (AC) with the text cursor (TC) so that the positioning of the respective cursor (AC, TC) is simplified considerably.

25 Claims, 2 Drawing Sheets

U.S. PATENT DOCUMENTS

| | | | |
|---|---|---|---|
| 5,812,882 | A | 9/1998 | Raji et al. |
| 5,857,212 | A | 1/1999 | Van De Vanter |
| 5,875,429 | A | 2/1999 | Douglas |
| 5,875,448 | A | 2/1999 | Boys et al. |
| 5,911,485 | A | 6/1999 | Rossmann |
| 5,960,447 | A * | 9/1999 | Holt et al. .................... 715/201 |
| 6,055,495 | A * | 4/2000 | Tucker et al. ................ 704/210 |
| 6,064,965 | A * | 5/2000 | Hanson ......................... 704/275 |
| 6,076,059 | A | 6/2000 | Glickman et al. |
| 6,122,614 | A | 9/2000 | Kahn et al. |
| 6,141,011 | A | 10/2000 | Bodnar et al. |
| 6,195,637 | B1 | 2/2001 | Ballard et al. |
| 6,307,548 | B1 | 10/2001 | Flinchem et al. |
| 6,338,038 | B1 * | 1/2002 | Hanson ......................... 704/500 |
| 6,374,225 | B1 | 4/2002 | Hejna, Jr. |
| 6,434,523 | B1 | 8/2002 | Monaco |
| 6,438,545 | B1 | 8/2002 | Beauregard et al. |
| 6,457,031 | B1 * | 9/2002 | Hanson ......................... 715/234 |
| 6,542,091 | B1 | 4/2003 | Rasanen |
| 6,611,802 | B2 * | 8/2003 | Lewis et al. ................... 704/235 |
| 6,760,700 | B2 * | 7/2004 | Lewis et al. ................... 704/235 |
| 6,763,320 | B2 | 7/2004 | Kimble |
| 6,792,409 | B2 * | 9/2004 | Wutte ........................... 704/276 |
| 6,802,041 | B1 | 10/2004 | Rehm |
| 6,865,258 | B1 | 3/2005 | Polcyn |
| 6,912,498 | B2 | 6/2005 | Stevens et al. |
| 6,950,994 | B2 | 9/2005 | Dharap |
| 6,986,106 | B2 | 1/2006 | Soin et al. |
| 6,993,246 | B1 * | 1/2006 | Pan et al. ....................... 386/52 |
| 6,996,445 | B1 | 2/2006 | Kamijo |
| 7,016,844 | B2 | 3/2006 | Othmer et al. |
| 7,137,076 | B2 | 11/2006 | Iwema et al. |
| 7,149,680 | B2 | 12/2006 | Storisteanu et al. |
| 7,196,691 | B1 | 3/2007 | Zweig |
| 7,206,938 | B2 | 4/2007 | Bender et al. |
| 7,236,931 | B2 | 6/2007 | He et al. |
| 7,260,529 | B1 | 8/2007 | Lengen |
| 7,292,975 | B2 | 11/2007 | Lovance et al. |
| 7,382,359 | B2 | 6/2008 | Griffin |
| 7,508,324 | B2 | 3/2009 | Suraqui |
| 7,515,903 | B1 | 4/2009 | Cast |
| 7,580,838 | B2 | 8/2009 | Divay et al. |
| 7,610,562 | B2 | 10/2009 | Rockey et al. |
| 2002/0002459 | A1 * | 1/2002 | Lewis et al. ................... 704/260 |
| 2002/0013707 | A1 | 1/2002 | Shaw et al. |
| 2002/0013709 | A1 | 1/2002 | Ortega et al. |
| 2002/0049588 | A1 | 4/2002 | Bennett et al. |
| 2002/0065653 | A1 | 5/2002 | Kriechbaum et al. |
| 2002/0115476 | A1 | 8/2002 | Padawer et al. |
| 2002/0143534 | A1 * | 10/2002 | Hol ................................ 704/235 |
| 2002/0143544 | A1 | 10/2002 | Gschwendtner |
| 2003/0004724 | A1 | 1/2003 | Kahn et al. |
| 2003/0007018 | A1 | 1/2003 | Seni et al. |
| 2003/0046080 | A1 | 3/2003 | Hejna, Jr. |
| 2003/0067495 | A1 | 4/2003 | Pu et al. |
| 2003/0083885 | A1 * | 5/2003 | Frimpong-Ansah .......... 704/277 |
| 2004/0029092 | A1 | 2/2004 | Orr et al. |
| 2004/0093220 | A1 | 5/2004 | Kirby et al. |
| 2004/0243760 | A1 | 12/2004 | Dahman et al. |
| 2005/0055332 | A1 | 3/2005 | Vasey |
| 2005/0149747 | A1 | 7/2005 | Wesinger, Jr. et al. |
| 2006/0176283 | A1 | 8/2006 | Suraqui |
| 2006/0206943 | A1 | 9/2006 | Ellison et al. |
| 2006/0253895 | A1 | 11/2006 | Brandofino et al. |
| 2006/0272025 | A1 | 11/2006 | Mononen |
| 2007/0143857 | A1 | 6/2007 | Ansari |
| 2007/0265845 | A1 | 11/2007 | Bennett et al. |
| 2007/0283444 | A1 | 12/2007 | Jang |
| 2007/0294745 | A1 | 12/2007 | Tan et al. |
| 2007/0300287 | A1 | 12/2007 | Wynne et al. |
| 2008/0034218 | A1 | 2/2008 | Bender |

FOREIGN PATENT DOCUMENTS

| | | |
|---|---|---|
| JP | 61-084771 | 4/1986 |
| JP | 62-212870 A | 9/1987 |
| JP | 02-163819 A | 6/1990 |
| JP | 05-108608 | 4/1993 |

OTHER PUBLICATIONS

"Improved Correction of Speech Recognition Errors Through Audio Playback, " *IBM Technical Disclosure Bulletin*, Jun. 1, 1993, pp. 153-154, vol. 26, No. 06A, IBM Corp., Armonk, New York.

International Search Report for International Application No. PCT/IB 02/01062 mailed Jun. 27, 2002.

Appeal Decision for Japanese Patent Application No. 2002-578284 dated Mar. 22, 2011.

Appeal Decision (excerpts) for Japanese Patent Application No. 2002-578284 dated Mar. 22, 2011.

Official Action for Japanese Patent Application No. 2002-578284 mailed Nov. 6, 2007.

* cited by examiner

SYNCHRONISE AN AUDIO CURSOR AND A TEXT CURSOR DURING EDITING

The invention relates to a correction device for correcting incorrect words in text information recognized from speech information by a speech recognition device.

The invention also relates to a correction method for the correction of incorrect words in text information recognized from speech information by a speech recognition device.

The invention further relates to a speech recognition device for recognizing text information from received speech information.

The invention also relates to a computer program product which comprises correction software of word processing software which is executed by a computer.

Such a correction device and such a correction method are known from U.S. Pat. No. 6,173,259 and are in the form of a computer executing word processing software of a corrector of a transcription service. A corrector is an employee of the transcription service who manually corrects text information recognized automatically with a speech recognition program.

An author of a dictation can send the speech information from his dictation via a computer network to a server of the known transcription service. The server distributes received speech information of dictations to various computers which each execute speech recognition software and in this case constitute a speech recognition device.

The known speech recognition device recognizes text information from the speech information of the dictation by the author sent to it, with link information also being established. The link information marks for each word of the recognized text information, part of the speech information for which the word was recognized by the speech recognition device. The speech information of the dictation, the recognized text information and the link information is transferred from the speech recognition device to the computer of the corrector for correction of the incorrect words in the recognized text information.

The known correction device contains synchronous playback means, with which a synchronous playback mode is made possible. When the synchronous playback mode is active in the correction device, the speech information of the dictation is played back while, in synchronism with each acoustically played-back word of the speech information, the word recognized from the played-back word by the speech recognition system is marked with an audio cursor. The audio cursor thus marks the position of the word that has just been acoustically played-back in the recognized text information.

If during the synchronous playback mode the corrector recognizes an incorrect word in the text information, then he interrupts or deactivates respectively, the synchronous playback mode, positions a text cursor at the incorrect word by means of the keyboard of the computer and edits it. Then he reactivates the synchronous playback mode, whereupon the playback of the speech information is continued from the corrected word onwards.

A corrector is paid by the provider of the transcription service according to how many words there are in the text information corrected by him. A quality controller at the transcription service takes samples of the text information corrected by the corrector, with the incorrect words overlooked by the corrector also affecting the pay of the corrector. A corrector therefore has a major interest in word processing software with which he can correct with the greatest time saving and lowest possible manual effort incorrect words recognized by him when the synchronous feedback mode is active. Correctors therefore seek to enter all the editing information necessary for correction of an incorrect word with the keyboard of the computer without using the mouse, since reaching for the mouse is time-consuming.

In the case of the known correction device and the known correction method, it has proven disadvantageous that the correction of a word recognized as incorrect in the activated synchronous display mode by the corrector requires relatively many manual operations on the side of the corrector as a result of which these corrections cost the corrector much time.

It is an object of the invention to provide a correction device in accordance with the type mentioned in the first paragraph, a correction method in accordance with the type mentioned in the second paragraph, a speech recognition device in accordance with the type mentioned in the third paragraph and a computer program product in accordance with the type mentioned in the fourth paragraph with which the above-mentioned disadvantages are avoided.

In order to achieve the above-mentioned object, in such a correction device features in accordance with the invention are provided so that the correction device can be characterized in the way set out in the following.

A correction device for correcting incorrect words in text information recognized by a speech recognition device from speech information comprising reception means for receiving the speech information, the associated recognized text information and the link information, which at each word of the recognized text information marks the part of the speech information at which the word was recognized by the speech recognition device, and comprising editing means for positioning a text cursor at an incorrect word of the recognized text information and for editing the incorrect word according to editing information entered by a user and comprising synchronous playback means to allow a synchronous playback mode, in which during acoustic playback of the speech information the word of the recognized text information just played back and marked by the link information is marked synchronously, while the word just marked features the position of an audio cursor and comprising cursor synchronizing means for synchronizing the text cursor with the audio cursor or the audio cursor with the text cursor.

In order to achieve the above-mentioned object, features in accordance with the invention are envisaged in such a correction method so that the correction method can be characterized in the way set out in the following.

A correction method for the correction of incorrect words in text information recognized from speech information by a speech recognition device, in which the following method steps are executed reception of the speech information, the associated recognized text information and link information, which marks the part of the speech information at which the word was recognized by the speech recognition device for each word of the recognized text information;

editing of the incorrect word with a text cursor according to editing information entered by a user;

allowing a synchronous playback mode, in which, during the acoustic playback of the speech information, the word of the recognized text information, which word is marked by the link information for the speech information just played back is marked synchronously, while the word just marked features the position of an audio cursor;

synchronizing the text cursor with the audio cursor or the audio cursor with the text cursor.

In order to achieve the above-mentioned object, features in accordance with the invention in such a speech recognition device are envisaged so that the speech recognition device can be characterized in the way set out in the following.

A speech recognition device for recognizing text information from received speech information comprising reception means for receiving the speech information and comprising speech recognition means for recognizing recognized text information and link information to be assigned to the received speech information, while the link information for each word of the recognized text information marks a part of the speech information at which the word was recognized by the speech recognition device, and comprising a correction device described above in order to correct incorrect words contained in the recognized text information.

In order to achieve the above-mentioned object such a computer program product includes features in accordance with the invention so that the computer program product can be characterized in the way set out in the following.

A computer program product which can be directly loaded into the internal memory of a digital computer and comprises software code sections, the computer executing the steps of the above-mentioned correction method if the product runs on the computer.

Since a user of the correction device with active synchronous playback mode normally checks the word for correctness that has just been marked by the synchronous playback means with the audio cursor, he recognizes an incorrect word in the recognized text information each time in the vicinity of the current position of the audio cursor. At this time the text cursor is normally positioned at a totally different position, namely at the position in the text information where the last incorrect word was corrected.

In accordance with the invention, the user may synchronize the text cursor with the audio cursor, for example by actuating a key on the keyboard, so that the text cursor is positioned at the position of the word last highlighted during synchronous playback. Since the incorrect word to be corrected is generally located in the vicinity of the text cursor positioned according to the invention, subsequent correction of the incorrect word is associated with very little manual, time-consuming effort.

In accordance with the invention, when the synchronous playback mode is active, the text cursor can also be continuously and automatically synchronized with the audio cursor. In this way the operation of a key of the keyboard for positioning of the text cursor could advantageously be completely dispensed with. Depending on the application it may be advantageous to synchronize the audio cursor with the text cursor, and thus to position to audio cursor at the position of the text cursor.

In accordance with the measures of certain embodiments, the advantage is obtained that synchronous playback mode does not have to be interrupted or deactivated for editing of an incorrect word. In this way, an experienced corrector may advantageously save a lot of time.

In accordance with the measures of certain embodiments, it has proven to be an advantage if the user, when recognizing an incorrect word, only needs to press the "right arrow" key to synchronize the text cursor positioned before the audio cursor in the recognized text information with the audio cursor. By pressing the "left arrow" key in this example the audio cursor would be synchronized with the text cursor and thus positioned at the position of the text cursor. This dynamic assignment of the "left arrow" key and of the "right arrow" key is particularly user-friendly.

In accordance with the measures of certain embodiments, it has proven to be an advantage that the text cursor is automatically positioned N words before the position of the audio cursor in the recognized text information, since because of the user's reaction time the incorrect word is normally found N words before the audio cursor in the recognized text information.

In accordance with the measures of certain embodiments, it has proven to be an advantage if the user can adjust the number N according to his normal reaction time.

In accordance with the measures of certain embodiments, it has proven to be an advantage if the cursors are automatically synchronized when the synchronous playback mode is activated, until the user uncouples them to edit an incorrect word. In this way particularly simple operation of correcting an incorrect word is advantageously achieved.

The invention will be described in the following with reference to an example of embodiment shown in the Figures, but without this representing a restriction to the invention.

Figure 1:
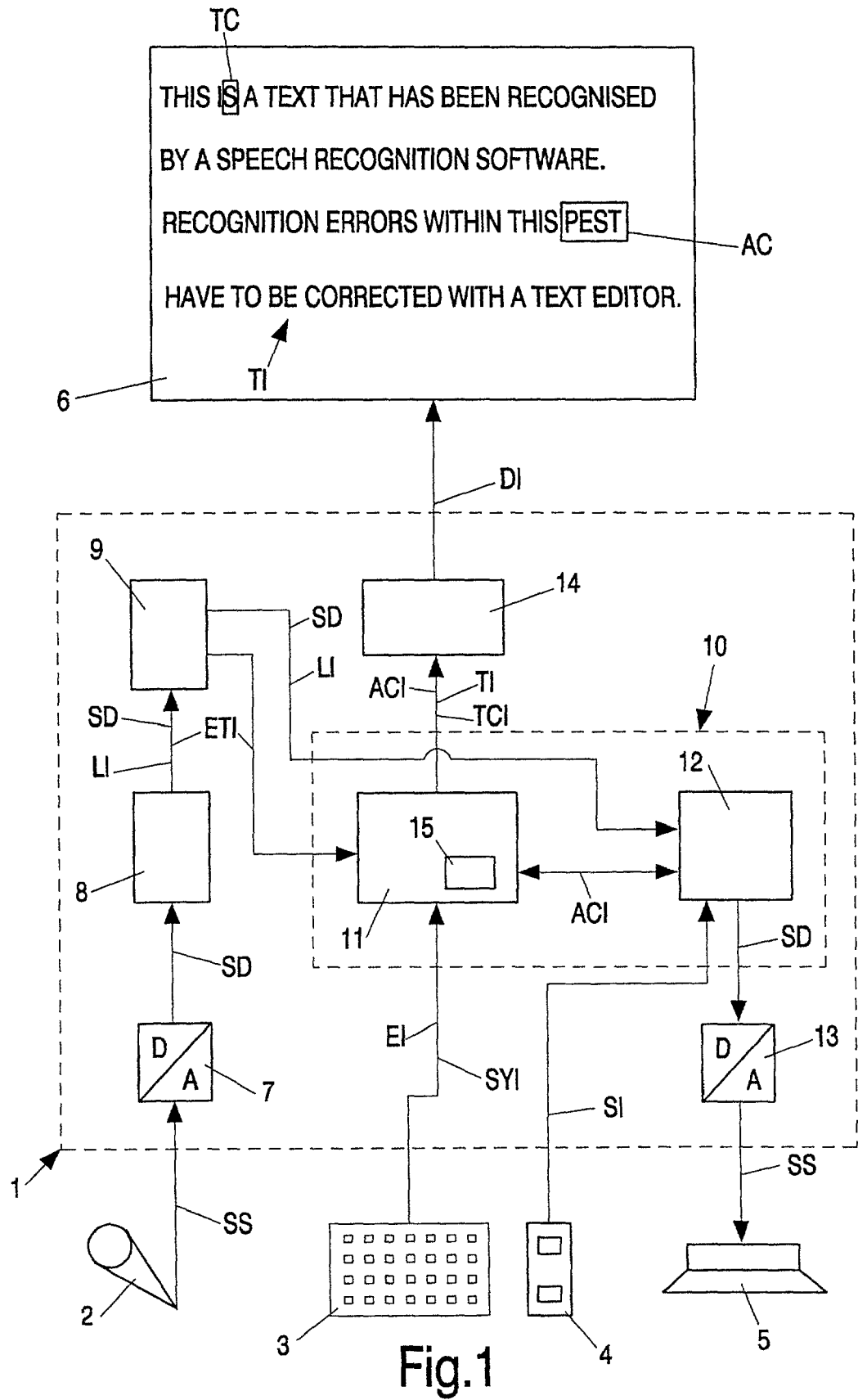
FIG. 1 shows a speech recognition device with a correction device for correcting incorrect words in a text that has been recognized by the speech recognition device.

FIG. 1 shows a speech recognition device 1 which comprises a computer with which speech recognition software and text pressing software is executed. The speech recognition device 1 has a microphone 2, a keyboard 3, a foot switch 4, a loudspeaker 5 and a screen 6 connected to it.

A user of the speech recognition device 1 can dictate into the microphone 1, whereupon a speech signal SS containing the speech information of the dictation is transferred to the speech recognition device 1. The speech recognition device 1 contains an A/D converter 7, with which the speech signal SS is digitized, whereupon the A/D converter 7 transfers digital speech data SD to the speech recognition means 8.

The speech recognition means 8 are designed to recognize text information assigned to the received speech data SD which in the following is referred to as recognized text information ETI; The speech recognition means 8 are further designed to establish link information LI which for each word of the recognized text ETI marks the part of the speech data SD at which the word has been recognized by the speech recognition means 8. Such speech recognition means 8 are known, for example, from the U.S. Pat. No. 5,031,113, the disclosure of which is deemed to be included in the disclosure of this document through this reference.

The speech recognition device 1 also has memory means 9, with which the speech data SD transferred by the speech recognition means 8 is stored along with the recognized text information ETI and the link information LI of the dictation. A speech recognition method of recognizing recognized text information ETI to be assigned to the speech information of a dictation such as that described above has been known for a long time so that it will not be discussed in further detail here.

The speech recognition device 1 also now has a correction device 10 for correction of incorrect words of the recognized text information ETI. The correction device 10 comprises the computer which executes the text editing software, which text editing software contains special correction software. The correction software 10 contains editing means 11 and synchronous playback means 12.

The editing means 11 are designed to position a text cursor TC at an incorrect word of the recognized text information ETI and to edit the incorrect word in accordance with editing information EI entered by a user. The editing information EI is in this case entered by the user with the keys of the keyboard 3, in the generally known manner.

The synchronous playback means 12 allow a synchronous playback mode of the speech detection device 1, in which the word of the recognized text information ETI marked by the link information LI concerning the speech information just played back is synchronously marked during the acoustic playback of the speech information of the dictation. This known synchronous playback mode which is also known from the U.S. Pat. No. 5,031,113 is very much liked by users of speech recognition devices since it allows effective correction of incorrect words.

When the synchronous playback mode with an audio cursor AC that changes from word to word of the recognized text information ETI is active in the speech recognition device 1, precisely each word is marked that is acoustically played back. Cursors can, for example, be displayed by underlining or inversion of the character shown at the cursor position, with a number of other possibilities for display of a cursor being known.

As can be seen from the text information TI shown with the monitor 6, when the synchronous playback mode is active both the text cursor TC and the audio cursor AC are visible, with the text cursor TC mostly marking one character and the audio cursor AC always an entire word. When the synchronous playback mode is active text cursor TC remains static at the position in the displayed text information TI at which the editing means 11 was used last to correct an incorrect word, whereas the audio cursor AC changes from word to word.

When the synchronous playback mode is active the audio data AD of the dictation stored in the memory means 9 can be read out by the synchronous playback means 12 and continuously transferred to a D/A converter 13. The D/A converter 13 can then transfer the speech information SI of the speech signal SS containing the dictation to the loudspeaker 5 for acoustic playback of the dictation.

To activate the synchronous playback mode, a user of the speech recognition device 1 can place his foot on one of the two switches of the foot switch 4, whereupon control information SI is transferred to the synchronous playback means 12. Then the synchronous playback means 12 in addition to the speech data SD of the dictation also read out the link information LI stored for the dictation in the storage medium 9.

When the synchronous playback mode is active the synchronous playback means 12 are designed to generate and transfer audio cursor information ACI to the editing means 11. The audio cursor information ACI marks in each case the word just played back acoustically and thus the position at which the audio cursor AC should be displayed in the text information TI displayed.

Immediately after the activation of the synchronous playback mode the editing means 11 are designed to read out the recognized text information ETI from the memory means 9 and to temporarily store it as text information TI to be displayed. This temporarily stored text information TI to be displayed corresponds for the time being to the recognized text information ETI and is corrected by the user by corrections to incorrect words in order to ultimately achieve error-free text information.

The text information TI temporarily stored in the editing means 11 is transferred from the editing means 11 to image processing means 14. The image processing means 14 process the text information TI to be displayed and transfer presentable display information DI to the monitor 6, which display information DI contains the text information TI to be displayed. The editing means 11 also transfer text cursor information TCI to the image processing means 14 which text cursor information TCI marks the position of the text cursor TC in the displayed text information TI. When the synchronous playback mode is active the editing means 11 also transfer the audio cursor information ACI for display of the audio cursor AC to the image processing means 14.

The editing means 11 of the correction means 10 now also contain cursor synchronization means 15 for synchronization of the text cursor TC with the audio cursor AC or the audio cursor AC with the text cursor TC. In this way the positioning of the text cursor TC for correcting an incorrect word recognized by the user is made considerably easier, further details of which are provided in the following using an example of application of the speech recognition device 1.

The editing means 11 are now also designed to position the text cursor TC and to edit a word recognized as incorrect by the user when the synchronous playback mode is active in the correction device 10. In this way a user skilled in correction can correct an incorrect word without first deactivating the synchronous playback mode and then reactivating it after the correction, so that the user can advantageously save much time. Further details of this are also provided in the example of application of the speech recognition device 1 that now follows.

Figure 2:
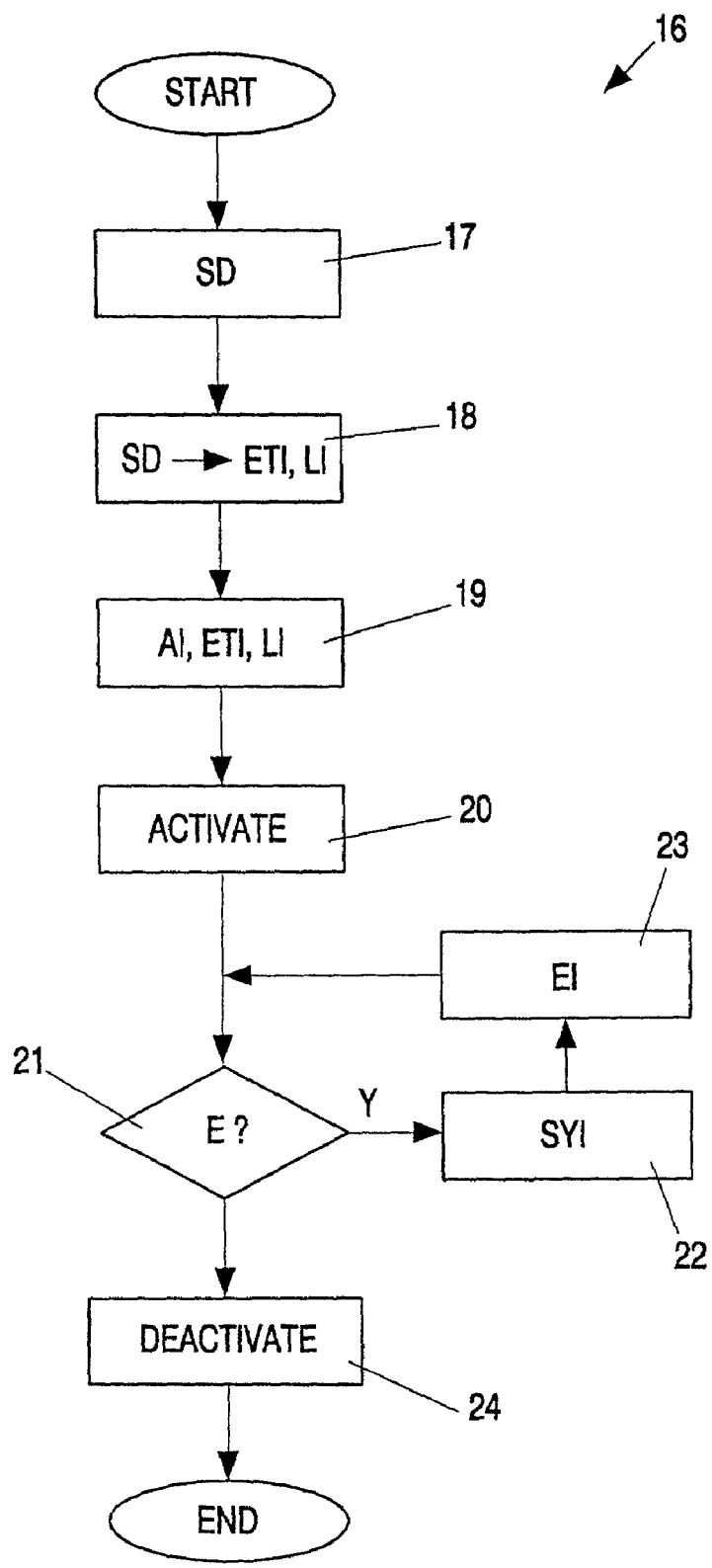
FIG. 2 shows a method of processing dictations, with a method for the correction of incorrect words in a text recognized by the speech recognition device also being executed.

The following example of application of the speech recognition device 1 is now explained using a flow chart 16 in FIG. 2. In accordance with the example of application it is assumed that a doctor is trying out his new speech recognition device and speaks a dictation "THIS IS A TEXT THAT ... ERRORS WITHIN THIS TEXT HAVE TO THE CORRECTED WITH A TEXT EDITOR" into the microphone 2, after which at a block 17 the digital speech data SD of the dictation is transferred to the speech recognition means 8. At a block 18 the speech recognition means 8 recognize the associated recognized text information ETI and link information LI and store it at a block 19 in the memory means 9. Since the doctor did not clearly pronounce some of the words of the dictation the speech recognition means 8 instead of the word "IS" recognize the word "MISS" and instead of the word "TEXT" the word "PEST".

At a later time—at a block 20—the doctor's secretary activates the synchronous playback mode of the speech recognition device 1, in order to correct incorrect words of the recognized text information. The editing means 11 then read the recognized text information ETI and the synchronous playback means 12 the speech data SD and the link information LI of the dictation from the memory means 9. The text information TI is then displayed with the monitor 6 and the acoustic playback of the dictation begins, whereupon the audio cursor AC, beginning with the word "THIS", marks one word after another of the dictation.

The secretary immediately recognizes the word "MISS" as an incorrect word and corrects this by entering corresponding input information EI with the keyboard 3. After the correction of the word "MISS" the text cursor TC remains positioned in the word "IS" at the position of the character "I", whereas the audio cursor AC continues to mark the text information TI word for word. At the point where the audio cursor AC marks the word "PEST" the secretary recognizes—at a block 21—this word as an incorrect word and presses—at a block 22—the "Alt+right arrow" combination of keys on the keyboard. As a result synchronization information SIY is transferred to the editing means 11 and the text cursor TC is synchronized with the audio cursor AC. As a result the text cursor TC is positioned at the first letter "P" of the incorrect word "PEST" and the secretary can—at a block 23—immediately begin to correct the incorrect word.

The advantage of this is that the secretary did not have to go through a number of key operations of the "arrow" keys in order to position the text cursor TC at the position of the incorrect word, which would have been very time-consuming. Likewise, in order to position the text cursor TC, the secretary did not have to reach for a computer mouse not shown in FIG. 1, which would also have been time consuming.

During the correction of the incorrect word "PEST" the synchronous playback mode remains active, since the secretary is already experienced enough during the correction of this word to follow the continued synchronous playback of the final words of the dictation. Only at the end of the dictation—at a block 24—does the secretary deactivate the synchronous playback mode by operating a second switch of the foot switch 4. The blocks 19 to 24 of the flow chart 16 describe the correction procedure in this case.

Since the secretary was also able to carry out the correction of the incorrect words "MISS" and "PEST" with the synchronous playback mode active, she was saved having to operate the foot switch a number of times and she was able to complete her work considerably more quickly which is a great advantage.

It may be observed that by pressing the key combination "ALT+Right arrow", whichever of the cursors that is positioned closer to the start of the text information TI relative to the other cursor will be synchronized with this other cursor. Furthermore, by pressing the "Alt+Left arrow" key the cursor that is positioned closer to the end of the text information TI relative to the other cursor is synchronized with this other cursor.

This dynamic assignment of the functions of the key combinations has proven to be particularly user-friendly. Obviously, for example the "Ctrl" key or the "Alt Gr" key can be used for the key combination instead of the "Alt" key. Furthermore, in the active synchronous playback mode the key combination can be dispensed with anyway and only the "Left arrow" key and the "Right arrow" key used with dynamic assignment.

It may be observed that the cursors could also be synchronized by operation of the foot switch or a computer mouse. Likewise it would be possible to synchronize the text cursor TC continuously and automatically with the audio cursor AC so that, when editing information EI is entered, the current position of the audio cursor AC would also be the same as the position of the text cursor TC.

It may be observed that depending on the application, it can also be advantageous to synchronize the audio cursor AC with the text cursor TC, so that the audio cursor AC would be located at the position of the text cursor TC. The synchronous playback of the dictation would then be continued from the position of the text cursor so that repetition of part of the playback of the dictation is easily possible.

It may be observed that both cursors following synchronization do not necessarily have to be located at the same position. So, for example, either cursor could be located by a number of N=3 words ahead of the other cursor. By means of this the user can balance his reaction time when an incorrect word is recognized, so that after synchronization the text cursor TC would respectively be positioned 3 words ahead of the audio cursor AC. Quick-reacting users could select N=1 and slower ones N=10, so that after the synchronization the text cursor TC would practically always already be positioned on the incorrect word, which is highly advantageous.

Furthermore, the text cursor TC which in the synchronous playback mode is coupled with the audio cursor AC with a shift of N words could be continuously displayed, so that after the recognition of an incorrect word a normally slow user would still be able to take as long with the input of the editing information EI as it takes the text cursor TC to be positioned directly on the incorrect word. This would also render a very efficient correction of incorrect words possible.

It may be observed that a correction device in accordance with the invention is particularly advantageous for users who spend the major part of their working time correcting recognized text information ETI and who are therefore very skilled at this. Such users are employed as so-called correctors inter alia at transcription services, as described, for example, in U.S. Pat. No. 6,173,259, the disclosure of which is deemed to be included in the disclosure of this document by reference.

Mention may be made that the correction device in accordance with the invention will mostly be part of a text editor program but does not have to be so.

It may be mentioned that the synchronous playback mode could be interrupted automatically by the inputting of synchronizing data SYI and continued after input of the editing data EI. This variant is particularly advantageous for inexperienced users of the correction device, as they do not thereby have to search for further incorrect words in the converted text information ETI in parallel with carrying out corrections.

It may be observed that the computer 1 may not be able to reproduce the dictation during synchronous playback in case the computer 1 does not comprise the necessary hardware for that. In such a case a digital dictation device that stores the speech data of the dictation may acoustically reproduce the audio of the dictation during synchronous playback and in addition may provide a position information to the computer. That position information marks the actual reproduction position of the audio playback and the computer may based on the position information mark the corresponding recognized word.

The invention claimed is:

1. A correction device for correcting incorrect words in text information recognized by a speech recognition device from speech information, comprising:

reception means for receiving the speech information, the text information recognized from the speech information and link information that associates portions of the text information with portions of the speech information from which the portions of the text information was recognized by the speech recognition device;

editing means for providing a text cursor for display, the text cursor indicating a position in the text information where at least one edit will be performed upon receiving editing information entered by a user;

audio playback means to provide an audio cursor for display during acoustic playback of the speech information, the audio cursor highlighting portions of the text information synchronous with the playback of the speech information according to associations provided by the link information such that, when displayed to the user, the audio cursor highlights the portions of the text information as the associated portions of the speech information are being acoustically played back; and cursor synchronization means for automatically synchronizing the text cursor and the audio cursor, wherein the cursor synchronization means comprises means for automatically positioning the text cursor at a predetermined position relative to a location of the audio cursor and automatically moving the location of the text cursor synchronous with the movement of the audio cursor during the acoustic playback until an editing operation is performed.

2. The correction device of claim 1, wherein after an editing operation is performed, the cursor synchronization means automatically synchronizes the text cursor with the audio cursor upon receiving a first keyboard input from the user and automatically synchronizes the audio cursor with the text cursor upon receiving a second keyboard input from the user.

3. The correction device of claim 2, wherein the cursor synchronization means includes a continuous synchronous playback mode and wherein the cursor synchronization means continuously automatically synchronizes the cursors when the continuous synchronous playback mode is active and wherein the continuous synchronous playback mode is deactivated upon receiving at least one first keyboard input from the user, wherein the cursor synchronization means uncouples the text cursor from the audio cursor upon deactivation, and wherein the continuous synchronous playback mode is activated upon receiving at least one second keyboard input from the user, wherein the cursor synchronization means resumes continuous synchronous playback upon activation.

4. The correction device of claim 1, wherein after an editing operation is performed the cursor synchronization means automatically synchronizes the text cursor and the audio cursor upon receiving at least one keyboard input, wherein, upon receiving a first keyboard input, the cursor synchronization means determines which of the text cursor and the audio cursor is positioned nearer an end of the text information and automatically synchronizes the text cursor and the audio cursor at a location proximate the cursor positioned nearer the end of the text information, and wherein, upon receiving a second keyboard input, the cursor synchronization means determines which of the text cursor and the audio cursor is positioned nearer a beginning of the text information and automatically synchronizes the text cursor and the audio cursor at a location proximate the cursor positioned nearer the beginning of the text information.

5. The correction device of claim 4, wherein the first keyboard input includes the "Right arrow" key, and wherein the second keyboard input includes the "Left arrow" key.

6. The correction device of claim 1, wherein the cursor synchronization means position the text cursor at a location in the text information a predefined number of words before the audio cursor when the continuous synchronous playback mode is active.

7. The correction device of claim 6, wherein the predefined number of words can be set by the user.

8. A method of assisting in correcting text information recognized by a speech recognition device from speech information, the method comprising:
   receiving the speech information, the text information recognized from the speech information, and link information that associates portions of the text information with portions of the speech information from which the portions of the text information were recognized by the speech recognition device;
   providing an audio cursor for display during acoustic playback of the speech information, the audio cursor highlighting portions of the text information synchronous with the playback of the speech information according to associations provided by the link information such that, when displayed to the user, the audio cursor highlights the portions of the text information as the associated portions of the speech information are being acoustically played back; and
   providing a text cursor for display to facilitate editing the text information, the text cursor indicating a position in the text information where at least one edit will be performed upon receiving editing information entered by the user; and
   automatically synchronizing the text cursor and the audio cursor, wherein automatically synchronizing the text cursor and the audio cursor comprises automatically positioning the text cursor at a predetermined position relative to a location of the audio cursor and automatically moving the location of the text cursor synchronous with the movement of the audio cursor during the acoustic playback until an editing operation is performed.

9. The method of claim 8, wherein automatically synchronizing includes automatically positioning the text cursor a predefined number of words before the audio cursor in the text information.

10. The method of claim 9, in which the predefined number of words can be set by the user.

11. The method of claim 8, wherein after an editing operation is performed automatically synchronizing includes automatically synchronizing the text cursor with the audio cursor upon receiving a first keyboard input from the user and automatically synchronizing the audio cursor with the text cursor upon receiving a second keyboard input from the user.

12. The method of claim 8, wherein automatically synchronizing includes, upon receiving a first keyboard input, determining which of the text cursor and the audio cursor is positioned nearer an end of the text information and automatically synchronizing the text cursor and the audio cursor at a location proximate the cursor positioned nearer the end of the text information, and upon receiving a second keyboard input, determining which of the text cursor and the audio cursor is positioned nearer a beginning of the text information and automatically synchronizing the text cursor and the audio cursor at a location proximate the cursor positioned nearer the beginning of the text information.

13. The method of claim 8, wherein automatically synchronizing includes continuously automatically synchronizing the text cursor and the audio cursor when a continuous synchronous playback mode is activated, the method further comprising:
   deactivating continuously automatically synchronizing upon receiving at least one first keyboard input from the user, the deactivating including uncoupling the text cursor from the audio cursor; and
   activating the continuous synchronous playback mode upon receiving at least one second keyboard input from the user to resume continuously automatically synchronizing the text cursor and the audio cursor.

14. At least one non-transitory computer readable medium encoded with instructions that, when executed by at least one computer, perform a method of assisting in correcting text information recognized from speech by a speech recognition device, the method comprising:
   receiving the speech information, the text information recognized from the speech information, and link information that associates portions of the text information with portions of the speech information from which the portions of the text information were recognized by the speech recognition device;
   providing an audio cursor for display during acoustic playback of the speech information, the audio cursor highlighting portions of the text information synchronous with the playback of the speech information according to associations provided by the link information such that, when displayed to the user, the audio cursor highlights the portions of the text information as the associated portions of the speech information are being acoustically played back;
   providing a text cursor for display to facilitate editing the text information, the text cursor indicating a position in the text information where at least one edit will be performed upon receiving editing information entered by the user; and automatically synchronizing the text cursor and the audio cursor, wherein automatically synchronizing the text cursor and the audio cursor comprises automatically positioning the text cursor at a predetermined position relative to a location of the audio cursor and automatically moving the location of the text cursor synchronous with the movement of the audio cursor during the acoustic playback until an editing operation is performed.

15. The at least one non-transitory computer readable medium of claim 14, wherein automatically synchronizing includes automatically positioning the text cursor a predefined number of words before the audio cursor in the text information.

16. The at least one non-transitory computer readable medium of claim 15, in which the predefined number of words can be set by the user.

17. The at least one non-transitory computer readable medium of claim 14, wherein automatically synchronizing includes automatically synchronizing the text cursor with the audio cursor upon receiving a first keyboard input from the user and automatically synchronizing the audio cursor with the text cursor upon receiving a second keyboard input from the user.

18. The at least one non-transitory computer readable medium of claim 14, wherein automatically synchronizing includes, upon receiving a first keyboard input, determining which of the text cursor and the audio cursor is positioned nearer an end of the text information and automatically synchronizing the text cursor and the audio cursor at a location proximate the cursor positioned nearer the end of the text information, and upon receiving a second keyboard input, determining which of the text cursor and the audio cursor is positioned nearer a beginning of the text information and automatically synchronizing the text cursor and the audio cursor at a location proximate the cursor positioned nearer the beginning of the text information.

19. The at least one non-transitory computer readable medium of claim 14, wherein automatically synchronizing includes continuously automatically synchronizing the text cursor and the audio cursor when a continuous synchronous playback mode is activated, the method further comprising:

deactivating continuously automatically synchronizing upon receiving at least one first keyboard input from the user, the deactivating including uncoupling the text cursor from the audio cursor; and activating the continuous synchronous playback mode upon receiving at least one second keyboard input from the user to resume continuously automatically synchronizing the text cursor and the audio cursor.

20. A correction device for correcting incorrect words in text information recognized by a speech recognition device from speech information, the correction device comprising:

at least one computer programmed to:

receive the speech information, the text information recognized from the speech information and link information that associates portions of the text information with portions of the speech information from which the portions of the text information was recognized by the speech recognition device;

provide a text cursor for display, the text cursor indicating a position in the text information where at least one edit will be performed upon receiving editing information entered by a user;

provide an audio cursor for display during acoustic playback of the speech information, the audio cursor highlighting portions of the text information synchronous with the playback of the speech information according to associations provided by the link information such that, when displayed to the user, the audio cursor highlights the portions of the text information as the associated portions of the speech information are being acoustically played back; and automatically synchronize the text cursor and the audio cursor, wherein the at least one computer is programmed to automatically position the text cursor at a predetermined position relative to a location of the audio cursor and automatically move the location of the text cursor synchronous with the movement of the audio cursor during the acoustic playback until an editing operation is performed.

21. The correction device of claim 20, wherein the at least one computer is programmed to automatically synchronize a position of the text cursor to a position of the audio cursor upon receiving a first keyboard input from the user and to automatically synchronize a position of the audio cursor to a position of the text cursor upon receiving a second keyboard input from the user.

22. The correction device of claim 21, wherein the at least one computer is programmed to implement a continuous synchronous playback mode, wherein when the continuous synchronous playback mode is active the cursors are synchronized, wherein the continuous synchronous playback mode is deactivated upon receiving at least one first keyboard input from the user, wherein the at least computer is programmed to uncouple the text cursor from the audio cursor upon deactivation of the continuous synchronous playback mode, wherein the continuous synchronous playback mode is activated upon receiving at least one second keyboard input from the user, and wherein the at least one computer is programmed to resume continuous synchronous playback upon activation.

23. The correction device of claim 20, wherein the at least one computer is programmed to implement a continuous playback mode wherein the text cursor is positioned at a location in the text information a predefined number of words before the audio cursor when the continuous synchronous playback mode is active.

24. The correction device of claim 23, wherein the predefined number of words can be set by the user.

25. The correction device of claim 20, wherein the at least one computer is programmed to automatically synchronize the text cursor and the audio cursor upon receiving at least one keyboard input, wherein, upon receiving a first keyboard input, the at least one computer determines which of the text cursor and the audio cursor is positioned nearer an end of the text information and automatically synchronizes the text cursor and the audio cursor at a location proximate the cursor positioned nearer the end of the text information, and wherein, upon receiving a second keyboard input, the at least one computer determines which of the text cursor and the audio cursor is positioned nearer a beginning of the text information and automatically synchronizes the text cursor and the audio cursor at a location proximate the cursor positioned nearer the beginning of the text information.

* * * * *